United States Patent [19]
King et al.

[11] 3,784,388

[45] Jan. 8, 1974

[54] WEAR RESISTANT ALUMINOUS CERAMIC ARTICLES

[75] Inventors: Alan G. King, Aurora, Ohio; John C. Logan, Leicester, Mass.

[73] Assignee: Norton Company, Worcester, Mass.

[22] Filed: Aug. 2, 1971

[21] Appl. No.: 168,461

Related U.S. Application Data

[62] Division of Ser. No. 764,582, Oct. 2, 1968, abandoned.

[52] U.S. Cl............... 106/73.4, 51/11, 106/45, 106/46, 106/65, 161/225, 264/332
[51] Int. Cl............................................ C04b 35/10
[58] Field of Search .................................................
106/39 R–73.4, 65, 45, 46; 264/332, 65

[56] References Cited
UNITED STATES PATENTS

| | | | |
|---|---|---|---|
| 2,369,709 | 2/1945 | Baumann et al. | 106/73.4 |
| 3,442,667 | 5/1969 | Berghezan | 106/73.4 |
| 3,294,496 | 12/1966 | Berghezan | 106/73.4 |
| 3,549,400 | 12/1970 | Lachman | 106/73.4 |
| 3,442,994 | 5/1969 | Herbert | 264/66 |
| 3,702,881 | 11/1972 | Chaklader | 264/332 |
| 2,538,959 | 1/1951 | Ballard | 264/332 |
| 3,379,523 | 4/1968 | Chaklader | 264/332 |
| 3,353,976 | 11/1967 | Raine et al. | 106/65 |

OTHER PUBLICATIONS

Wheildon–Ceramic Bulletin (May 1963) pp. 308–311, "Wear Resistant Ceramic Tooling in the Fabrication of Ceramic Shapes."
Ceramic Industry–"1967 Handbook of Materials for Ceramic Processing"–(Jan. 1967) pgs. 61, 63, 66 & 71.

*Primary Examiner*—Helen M. McCarthy
*Attorney*—Arthur A. Loiselle, Jr.

[57] ABSTRACT

This invention relates to low cost, strong, highly wear resistant ceramic articles, the wear resistance being comparable to that of cemented carbides. The ceramic articles are hot-pressed bauxite compositions, 78–94 percent $Al_2O_3$, less than 9 percent $SiO_2$, 2–8 percent $Fe_2O_3$, 2–4 percent $TiO_2$ and a total of less than 3 percent CaO, MgO, $Na_2O$.

1 Claim, 7 Drawing Figures

PATENTED JAN 8 1974  3,784,388

INVENTORS:
ALAN G. KING
JOHN C. LOGAN
BY
Rufus M. Franklin
ATTORNEY

WEAR RESISTANT ALUMINOUS CERAMIC ARTICLES

This application is a division of copending U.S. Pat. application Ser. No. 764,582 filed Oct. 2, 1968, now abandoned.

BACKGROUND OF THE INVENTION

The field of this invention is that relating to high strength, highly wear resistant ceramic artifacts in general, and in particular to artifacts made from raw materials high in alumina. Such finished ceramic artifacts or articles are commonly used to great advantage in such wear resistant applications as abrasive blasting nozzles, liners for pulverizing mills, suction box covers used by the paper manufacturing industry, refiner plate, liners in blenders, dust collectors, pumps, ore shutes, facing on mining equipment, and the like. More recently such ceramic articles, particularly those made by hot-pressing, have been and are being used with a high degree of success as armor plate for the protection of equipment and personnel, against ballistic threat; the success of these ceramic materials has been largely due to their high strength characteristics and their light weight as compared to the more conventional armor materials like steel.

Wear resistant ceramic materials such as sintered alumina compositions, porcelain, stellite, tungsten carbide, boron carbide, and even sintered bauxite, have been known for many years as evidenced by the use of articles fabricated from such ceramic materials, described in U.S. Pat. No. 1,096,688; U.S. Pat. No. 1,393,562; U.S. Pat. No. 3,228,147. The utilization of these high strength ceramic materials as protective armor, is not nearly as well known; however, the use of at least one, namely boron carbide, has been described by J. V. E. Hansen in Research and Development, June 1968, pages 26–31.

Although these materials have been and are being used with a high degree of success, they do suffer from the significant disadvantage of high cost. For example, some of the best wear resistant, high strength ceramic artifacts are manufactured from such base materials as tungsten carbide, titanium carbide, boron carbide, or high purity alumina; such articles can be fabricated by relatively well known hot-pressing techniques, but the basic raw materials themselves are very expensive. On the other hand, the use of less expensive base materials like bauxite, clay, or steatite historically have not produced manufactured articles with the superior properties of articles made from the aforementioned base materials. However, where optimum properties are not necessary or where cost is of prime importance, protective ceramic articles made from low cost raw materials like bauxite or porcelain, have found some commercial success.

The ceramic article with which this invention is concerned, have been fabricated from both the sintering process and the hot-pressing process. Both processes are well known; a typical sintering process is described in U.S. Pat. No. 2,347,685, while two hot-pressing processes are described in U.S. Pat. No. 3,279,917 and No. 3,340,270.

SUMMARY OF THE INVENTION

The principal object of the present invention is to provide an essentially alumina ceramic, at relatively low cost, possessing high mechanical strength and a high degree of wear resistance.

Another object is to provide low cost ceramic artifacts manufactured from natural or synthetic bauxite which can be fabricated with a metallic component, such as a mounting or affixing means or a metallic reinforcing means, molded directly into the aluminous ceramic article.

Still another object is to provide a particular relatively inexpensive process for the manufacture of such high performance ceramic articles from bauxite and bauxite like compositions.

In brief, these objects are accomplished in accordance with the invention by first thoroughly milling natural bauxite containing principally $Al_2O_3$, $Fe_2O_3$, and $TiO_2$ until the said bauxite is chemically uniform; calcining the bauxite at 400°–1,000° C; placing the proper amount of this milled and calcined natural bauxite in a graphite mold, or a mold of other suitable refractory material of desirable shape, for example, a mold with a cavity shaped so as to form a sandblasting nozzle; and hot-pressing the so disposed bauxite at a pressure of not less than 800 psi and a temperature of from 1,100°–1,400° C for a period of 5–25 minutes. Ceramic article such as sandblasting nozzles, protective plates, liners for mills, etc. produced from bauxite in this manner possess mechanical strength and wear resistant properties at least equal to all of the high strength wear resistant ceramic materials like relatively pure, high density, sintered alumina, hot-pressed relatively high purity alumina, sintered bauxite, tungsten carbide, and the like, and being only slightly inferior in wear resistance to boron carbide.

The high performance ceramic articles of this invention can also be made from synthetic bauxite. The interest of fabricating the aforementioned articles of synthetic bauxite is at the present time only academic, because of the high cost, relative to naturally occuring bauxite, of fabricating this so-called synthetic bauxite. However, if one desires to go to the trouble and expense of synthesizing a bauxite-like composition within the compositional range defined by this invention, the novel ceramic articles of the said invention can be made.

To accomplish this, one needs only to mix together, in a finely particulate manner, the proper quantities of the metal oxides, as disclosed herein, by the reasonably well known techniques of the colloidal chemical processes. The manner in which the various metal oxides are blended together is highly critical however, and must be done by a colloidal method or some other process that results in at least as intimate a mixture as does the colloidal method. In natural bauxite, the oxides are intimately mixed or coprecipitated by nature and are very finely divided. These conditions are almost impossible to duplicate by mere mechanical mixing or even milling together of the desired oxides. To produce the optimum bauxite-like ceramic article of this invention, the various oxides should be mixed together intimately, each oxide having a particle size in the range of so-called colloidal particles, that is about 500 millimicrons. Once the synthetic bauxite has been prepared, it is then processed in a manner identical to that used with the natural bauxite to produce the strong, wear resistant bauxite ceramic material or articles of this invention.

Ceramic materials made by the process and from the bauxite and bauxite-like materials, hereinafter referred to as "bauxite," manufactured in accordance with the preferred embodiments of the invention, exhibit compressive strength of the order of 400,000 psi and wear resistant properties of the order of magnitude of the extremely wear resistant material boron carbide.

One of the more significant features of the invention is that because of the relatively low temperature of hot-pressing, metal components such as metal fasteners, metal backings, or even metal reinforcing rods or mesh, can be molded right into the "bauxite" ceramic article. The metal need only be one which has a melting point in excess of the hot-pressing temperature and a coefficient of thermal expansion equal to or greater than the "bauxite."

DESCRIPTION OF THE PREFERRED EMBODIMENTS

Figure 1:
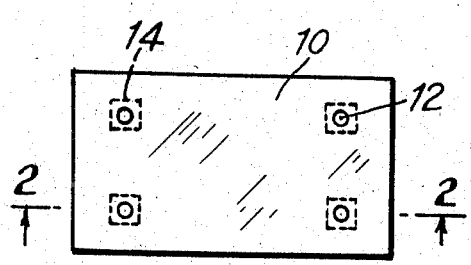
FIG. 1 is a top view of a hot-pressed "bauxite" ceramic brickette 10 containing therein the threaded mounting bolts 12 molded into said brickette 10.
Figure 2:
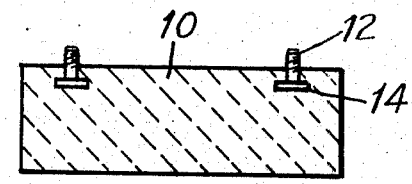
FIG. 2 is a sectional edge view of brickette 10 taken along the line 2—2 in FIG. 1, showing the mounting bolts 12 with the flange 14 of said mounting bolts embedded in the ceramic brickette 10.

The use of sintered bauxite ceramic articles as wear resistant surfaces has been known for many years (see the numerous patents to J. A. Heany, e.g. U.S. Pat. Nos. 2,347,685, 2,339,264, 2,310,953, 2,311,228). These sintered bauxite ceramic articles, however, though superior in wear resistance to most metals, were inferior to such highly wear resistant ceramic materials as tungsten carbide and boron carbide. The principal advantage of the sintered bauxite ceramic articles, relative to articles of the latter type of ceramic materials, was the relative low cost. It was, therefore, surprising to discover that when certain bauxites, that is bauxites within a certain compositional range, were hot-pressed within a relatively narrow temperature and pressure range, bauxite ceramic articles resulted which were superior in physical properties, particularly in wear resistance.

The unexpectedly high strength and highly wear resistant ceramic material of this invention is a result of the peculiar chemical composition and fine grain size created by nature in bauxite found in certain parts of the world. The main constituents of bauxite are alumina, silica, ferric oxide, and titania. The relative proportions of these oxides are highly variable, depending upon the original character of the soil from which they are derived, the weathering conditions to which they were subjected, and the geological time interval over which the weathering process has occured. Almost any bauxite can be utilized in the practice of this invention. However, certain bauxite, that is bauxites mined from certain parts of the world, are more ideally suited than are others. Table I shows the composition, after calcining, of four bauxites which can be used to make the novel ceramic material disclosed herein.

Table I

| Bauxite Type | %$SiO_2$ | %$TiO_2$ | %$Fe_2O_3$ | %$Al_2O_3$ |
|---|---|---|---|---|
| Arkansas | 8.84 | 2.68 | 3.29 | 85.19 |
| Metal Grade | 6.88 | 2.68 | 1.49 | 88.95 |
| Surinam | 2.53 | 3.32 | 6.74 | 87.41 |
| Jamaican | 4.13 | 1.96 | 14.05 | 79.86 |

Although all of the bauxite types listed in Table I produce ceramics of unusual strength and wear resistance, that resulting from the so-called Surinam bauxite is superior to those produced by the other types. The proportions of the four principal oxides found in bauxite can be varied rather widely, but the composition approaching the ideal is that of low silica, and high iron and titania, with of course the main constituent of the material being alumina. More specifically, an optimum composition has approximately 3 percent titania, 7 percent ferric oxide, a silica content less than 3 percent, and the remainder alumina.

The aforementioned "optimum composition" was arrived at by experimentation with a series of synthetically produced bauxites wherein the percent concentrations of silica, titania and ferric oxide were varied, maintaining the alumina constant. In these experiments the silica content was varied from 0 to 5 percent, the titania varied from 0 to 5 percent, and the ferric oxide varied from 0 to 5 percent, the remainder being alumina. The result of this work showed that both the processing and the properties of the final ceramic article were pronouncely enhanced by the presence of the higher amounts of titania and ferric oxide, the iron oxide in particular having a very significant effect upon the densification of the final article. The silica appeared to have no beneficial effect in either the processing or the properties of the final product, in fact the most superior product was obtained when the original raw material batch contained no silica.

Naturally occuring bauxites then, to be suitable for the practice of this invention, should fall within the approximate compositional range of from 78–94 percent $Al_2O_3$, less than 9 percent silica, 2–8 percent $Fe_2O_3$, 2–4 percent $TiO_2$, and up to 3 percent total of minor impurities such as CaO, MgO, and $Na_2O$.

Natural bauxite as mined is a soft rock which must be crushed. Furthermore as previously mentioned, bauxite is made up principally of the hydrates of alumina, titania, ferric oxide and silica, and therefore cannot be used to manufacture ceramic materials, until the water of hydration is removed. To accomplish this, crude bauxite is rough crushed and calcined at from 400 –

1,000° C for varying periods of time depending on the type of calciner used, and such physical aspects such as the size of the rough crushed bauxite particles, the thickness of the bed of material being calcined, etc. It must be recognized that calcining temperatures significantly below 900° C will not result in a completely dehydrated product; calcining at about 400° C will remove about 75 percent of the water of hydration which results in a material which is usable in the practice of this invention, but not without some difficulty. The water remaining after calcining at 400° C, or for that matter any temperature significantly below 900° C, will sometimes produce a damaged final product as a result of pressure exerted by the volatilization of the residual water brought about by the hot-pressing steps in the overall process. Ideally, calcination should be carried out at about 900° C to insure complete removal of the water of hydration.

Natural bauxite as mined is notoriously quantitatively nonuniform in character. This nonuniformity is extreme in bauxites mined in different geographical locations. However, even with bauxite mined in the same location, that is from the same vein, the quantitative nonuniformity can be quite extreme. In order to produce high grade bauxite ceramic articles, the as mined, rough crushed bauxite is milled until the material is chemically uniform. The milling process may be carried out with any of a number of conventional types of mills such as ball mills, hammer mills, impact mills, and so on. The time of milling need only be as long as is necessary to render the original rough crushed bauxite, reasonably uniform.

If the milling, to make the rough crushed bauxite uniform, is done wet then it should be carried out prior to the calcining step in order to remove the milling water at the same time as the water of hydration. If the milling is done dry, then it may be done either before or after calcining.

The last consideration with respect to the raw material proper, is the effect of particle size (distinguished from crystal size). The particle size is relatively unimportant so long as the various oxides are uniformly distributed throughout each particle. Very coarse particle e.g. one-eighth inch in diameter can be used because of the pressure-temperature character of the forming process. However, in following the practice of the invention, wherein the "bauxite" is milled, the resulting base material is always very finely particulate, with the average particle size running well below 50 microns.

The process by which the ceramic articles of this invention are produced, is the reasonably well known ceramic fabricating technique called hot-pressing. The hot-pressing process and apparatus is adequately described in the literature, for example in U.S. Pat. No. 2,618,567, No. 3,279,917, No. 3,303,533, No. 3,340,270, therefore, there is no need here to discuss in any great detail the hot-pressing process or apparatus. However, a very fundamental aspect of the instant invention is the narrow temperature range which must be used with a "bauxite" of a particular chemical composition in order to produce the desired novel "bauxite" ceramic articles. It has been found that in order to produce from "bauxite" the desired ceramic, the hot-pressing must be done within the relatively narrow temperature range of 1,100°–1,400° C and preferably at about 1,250° C. The optimum product is normally produced at the latter temperature. As the hot-pressing temperature drifts to either side of 1,250° C, the overall desirable properties of the ceramic product begin a gradual deterioration. Still, within the range of 1,100°–1,400° C, the resultant product is equivalent to or only slightly inferior to the high grade high priced ceramic materials currently used in most wear resistant applications or applications where a high strength ceramic material is required. Of the three process variables, temperature, pressure, and time, temperature is the most critical. A more detailed description of the theoretical aspects of the invention is forthcoming, therefore, suffice it to say here that in the fabrication of a ceramic piece of a thickness to be of any utility, a temperature below 1,100° C will not permit sufficient densification of the bauxite powder at any reasonable pressure; on the other hand, temperatures in excess of 1,400° C result in crystal growth which is detrimental to the high strength and wear resistant properties of the product.

The effective pressure range of the process is governed by the aforementioned temperature limits of 1,100°–1,400° C and by the thickness of the ceramic article desired. It was found that to produce a highly wear resistant ceramic article with a reasonable degree of strength the thickness of the piece had to be of the order of one-fourth inch which necessitated a minimum pressure of 800 psi even at the upper temperature limit of 1,400° C. There is essentially no upper limit on the pressure except that dictated by practicality and equipment limitations. However, in all cases the pressure at any given temperature must be sufficiently high to densify the "bauxite" to a minimum density of about 3.62 g/cc. Obviously if one desires to make two high strength wear resistant plates, one with a thickness of ¼ inch and the other with a thickness of 1 inch, at a temperature of 1,250° C, the production of the 1 inch thick plate would require a higher pressure than that of the ¼ inch thick plate.

The time variable of the hot-pressing step of the process, which in this case means the time the material being pressed is at a specific predetermined temperature, is most conspicuously affected by the hot-pressing temperature. It was found that the higher the hot-pressed temperature the shorter the hot-press time must be in order to avoid significant changes in crystal size in the direction of crystal growth.

To fabricate an article of the ceramic material of this invention in a particular desired thickness there is obviously an optimum pressure-temperature-time combination which can be readily determined by a minor amount of experimentation or one may arbitrarily select the middle of the range for each of the three variables.

There is a modification of the process just described which, although not a major technical contribution in light of the present state of the art, is of significant economic interest. In this modified method the milled and calcined "bauxite" is dampened with a small amount of an organic material which functions as a temporary binder; this is a well known method used in the ceramic and refractory fabricating industry. The dampened "bauxite" is then preformed to the desired shape by pressing in a mold at room temperature. A number of these preformed articles of the same shape and with at least two dimensions the same, are placed in a single graphite mold and "gang pressed" at the desired elevated temperature and pressure. During the hot-pressing phase, the temporary binder, being organic, burns cleanly out of the ceramic body. The principal advantages of cold forming prior to "gang pressing" in the hot-press is an increase in production rate and a more efficient utilization of the hot-pressing equipment.

Any other cold forming technique can be used as effectively, e.g. slip casting.

Ceramic articles resulting from combinations of the aforedescribed materials and process possess unexpectedly high wear resistant properties. The wear resistant properties are measured by a specially devised abrasion test and are represented by a number called a "wear factor"; the lower the value of the so-called wear factor, the greater is the resistance of the material in point to wear. The wear factor values are arrived at through the use of a specially designed apparatus which essentially subjects a test sample of material to abrasion by silicon carbide grit at a known pressure, traveling across the face of the test sample at a known velocity, for a predetermined period of time after which the depth of penetration of the piece or the thickness of material worn off by the abrasion, is measured. These values are then used to calculate the "wear parameter" which in turn is used to arrive at the wear factor by relating the calculated wear parameter to the wear parameter of an arbitrarily selected reference material. More specifically, for the material of this invention, the test is carried out using 46 grit silicon carbide, a pressure of 24 psi, and a grain velocity of 760 feet per minute; the reference material is 1,020 hot rolled steel, and the test sample size is $1 \times \frac{1}{2} \times \frac{1}{2}$ inch, presenting a $\frac{1}{2} \times 1$ inch surface. The measured time interval of abrasion was varied in order to get a depth of penetration into the sample piece sufficient to be capable of accurate measurement. The wear parameters are calculated using the following equation:

wear parameter = Y/T/V, where:

V equals grain velocity

T equals time of run

Y equals inches of penetration (thickness of layer abraded away)

The wear parameters, so derived, of materials being tested are then related to the wear parameter of 1,020 hot rolled steel by dividing the former by the latter, resulting in a number called the "wear factor." Materials with a wear factor of less than 1 are superior in wear resistance to the reference 1,020 hot rolled steel.

In this manner a number of high grade commonly used wear resistant ceramic materials were compared in wear resistant properties, to the hot-pressed "bauxite" ceramic material of this invention. The results are shown in Table II.

Table II

| Material | Wear Factor |
|---|---|
| 1020 Hot Roll Steel | 1.00 |
| Alumina, high purity hot-pressed | 0.70 |
| Bauxite A, sintered | 0.70 |
| M2 high speed tool steel | 0.54 |
| Titanium boride, hot-pressed | 0.31 |
| Tungsten carbide, cobalt bonded, hot-pressed | 0.15 |
| Boron carbide, hot-pressed | 0.06 |
| Bauxite A, hot-pressed at 1200°C. | 0.13 |
| Bauxite A, hot-pressed at 1300°C. | 0.17 |
| Bauxite A, hot-pressed at 1400°C. | 0.31 |

Bauxite A was a Surinam bauxite with the following composition:

$Al_2O_3$ — 87.3%

$Fe_2O_3$ — 6.7%

$TiO_2$ — 3.3%

$SiO_2$ — 2.5%

Other Materials — 0.2%

From the Table it can be readily observed that the Bauxite A samples hot-pressed at 1,200° C, 1,300° C, and 1,400° C are superior to all the materials listed down to and including the highly wear resistant material titanium boride. Those bauxites hot-pressed at 1,200° C and 1,300° C are about equal in wear resistance to cobalt-bonded tungsten carbide and approaching that of the extremely wear resistant hot-pressed boron carbide. Table II also shows the effects of pressing temperature on the wear resistant character of the Bauxite A. Hot-pressing at 1,200°–1,300° C produces materials with approximately the same high resistance to wear, however, when the temperature exceeds 1,300° C a decrease in wear resistance occurs as a function of temperature, indicated by the almost 100 percent decrease in wear resistance going from a hot-press temperature of 1,300° C to 1,400° C.

In addition, the wear factor, besides being affected by temperatures in excess of 1,400° C, is also affected by the specific gravity of the ceramic article resulting from various combinations of temperature and pressure within the temperature-pressure parameters of the invention. For example, a series of test specimens made from various processing conditions between 1,100°–1,400° C and 800–6,000 psi varied in specific gravity from 3.63 to 3.91 g/cc with a corresponding wear factor range of 0.25 to 0.13.

"Bauxite" ceramic materials manufactured in accordance with the preferred embodiments of the invention have the respectable transverse strength of 45,000 psi and the very impressive compressive strength of 400,000 psi, when the "bauxite" is hot-pressed close to its maximum theoretical density. Hot-pressed specimens can be pressed close to their theoretical specific gravity with pressure as low as 800 psi and temperatures down to as low as 1,100° C when the thickness of the specimen being fabricated is of the order of ¼ inch. As would be obvious to one skilled in the art, the greater the desired thickness of the final ceramic article, the greater must be the temperature and/or pressure to compact such materials as powdered "bauxite" to maximum theoretical density.

A further embodiment of the invention, which is of cardinal significance, is the face that because the hot-pressing temperatures are relatively low, i.e., less than 1,400° C, metal components can be molded directly into the ceramic article as it is being hot-pressed. This provides ceramic artifacts containing molded-in functional metal components such as threaded bolts or lugs for fastening the ceramic to the walls of for example milling equipment, ore shutes, mining equipment and the like; or metallic reinforcing media like rods, wire mesh, perforated plates, particles, or chopped strands; or metal tubes or coils for the purpose of conveying cooling air or liquids. The only limiting factor with respect to the successful molding in of metallic components is that the metal component must be composed of a metal with a thermal coefficient of expansion equal to or greater than that of the ceramic and of course the melting point of the metal must be in excess of 1,400° C. or if the preferred molding temperature of 1,250° C. is used, the metal must have a melting point in excess of the latter temperature. The utility of such a high strength, high wear resistant ceramic-metal composite is limited only by the imagination.

Although all of the technical reasons for the unexpected high strength and high wear resistant properties of the ceramic materials of the invention have not been elucidated, sufficient of them have been identified to allow formulation of what appears to be a reasonable theory.

Extensive microscopic studies and physical testing of ceramic specimens fabricated from natural bauxite and synthetic bauxite, hot-pressed at 1,100°–1,400° C, have brought to light two pertinent facts, namely:

A. The very fine crystalline nature of the original starting raw material did not change greatly over the temperature range used, because of the low temperatures employed. Hot-pressing at temperatures from 1,100° C to 1,400° C produced ceramics with numerical average crystal sizes ranging from 0.5 microns (the approximate crystal size of the unpressed original raw material) to about 1.8 microns.

B. The appearance of iron-alumina spinel which was not originally present, and the fibrous texture and globular particles of iron, both evidence the presence of a liquid phase.

The presence of the liquid phase at these low pressing temperatures accounts for the high densities acquirable and unique apparently to the "bauxite" like compositions disclosed herein which in turn are major contributors to the high strength and wear resistant properties which result. The finely crystalline nature of these ceramics which results from the low pressing temperatures contributes in a major way to the inherent strength, as evidenced by the decrease in wear resistance resulting from temperatures above 1,300° C accompanied by an increase in crystal size, plus the generally accepted theory that the strength of sintered, fused and hot-pressed ceramics is inversely proportion to the average crystal size, when the material in point is polycrystalline.

EXAMPLE I

In a typical example of practice of the invention, Surinam bauxite was made suitable for hot-pressing by first placing in a conventional porcelain ball mill, 2,500 grams of raw bauxite, 2,500 grams of water, and 5,000 grams of ordinary alumina milling balls. The porcelain jar was then covered and placed on mill rollers and the bauxite milled for 24 hours. The excess water was then decantered off and the wet, finely pulverized, and intimately blended bauxite was then calcined at 1,000° C for 4 hours. Microscopic examination of the calcined material showed it to have an average particle size of about 4 to 5 microns which is about the average crystal size of the oxides found in natural bauxite. At this point 1,245 grams of the milled and calcined bauxite was placed in a graphite mold of suitable dimensions to facilitate hot-pressing of a brickette 4.5 × 2.5 × 1.75 inches. The bauxite contained in the graphite mold was then placed in a hot-pressing apparatus such as that described in U.S. Pat. No. 3,303,533 and pressed at 5,000 psi and at a temperature of 1,250° C, maintaining said temperature for a time sufficient to allow the entire mass of the bauxite being hot-pressed to be at the temperature of 1,250° C for about 5 minutes. At this point, both the temperature and pressure were released and the hot-pressed brickette and mold setup were allowed to cool slowly for about 12 hours. The brickette so fabricated was hard and dense with a specific gravity of 3.88 g/cc and a wear factor of 0.16.

EXAMPLE II

A second 2,500 grams quantity of Surinam bauxite was made suitable for hot-pressing in a manner identical to that described in Example I. About 890 grams of the milled and calcined bauxite were placed in a mold identical to that of Example I. However, in this case, the total 890 grams of bauxite was placed in the mold in increments with hand tamping to compact the powder after the addition of each increment. After about 60 percent of the 890 grams had been added incrementally to the mold with tamping, two solid pieces of steel measuring approximately 0.75 × 0.75 × 0.50 and containing a small flange on the bottom, were carefully placed in the mold, the remainder of the 890 grams of bauxite were added and tamped. The tamped bauxite containing the two metal inserts was then pressed in the same manner as described in Example I. After cooling the piece was removed from the mold and metal inserts drilled and tapped to receive a bolt which was used to attach the finished ceramic piece to a metal backing.

Figure 3:
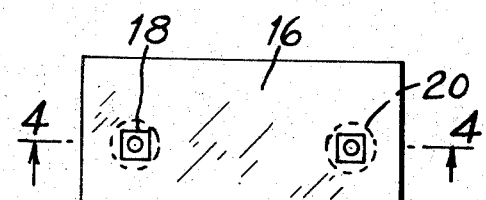
FIG. 3 is a top view of a hot-pressed "bauxite" ceramic brickette 16 containing therein the threaded mounting lugs 18 molded into said plate 16.
Figure 4:
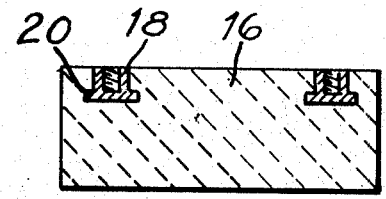
FIG. 4 is a sectional edge view of brickette 16 taken along the line 4—4 in FIG. 3, showing the mounting lugs 18 with the flange 20 of said mounting lugs embedded in the ceramic plate 16.

The configuration of this ceramic-metal composite was approximately that represented by FIGS. 3 and 4.

EXAMPLE III

Ten bauxite ceramic plates or tiles measuring 6 × 6 × ⅜ inches were made by first ball milling 6,000 grams of Surinam bauxite in 6,000 grams of water, for 24 hours. The compositionally uniform bauxite was then freed of excess water and calcined at 900° C for 4 hours. A 3,000 gram quantity of the milled and calcined bauxite was placed in a conventional Hobart mixer and 300 grams of a 4 percent Methocel (methyl cellulose derivative) in water, was added to the bauxite; the mixture was blended until uniform. 300 grams of this mix was placed in a steel mold measuring 6 × 6 × 4 inches, with appropriate bottom plate and top plate, and the mix was pressed at 1,500 pounds per square inch at room temperature, the mold and plates having been previously coated with butyl stearate which functioned as a release agent. The plate or tile cold-pressed in this manner was removed from the mold and dried for 10 hours at 60° C. An additional 9 tiles or plates were cold-pressed in an identical manner. These cold-pressed or so-called preformed plates measured 6 × 6 × ¾ inches and had a density of approximately 1.6 grams per cc. The plates were then loaded into a single conventional graphite mold measuring interiorly 6 × 6 × 20 inches, having a graphite bottom plate or plunger block and a top plate or plunger block, the preformed plate placed in the mold, each separated from the other by a ½ inch thick graphite spacer plate. The cold formed plates contained in the graphite mold were then subjected to a 6 hour heating cycle at a pressure of 1,500 psi, the heating cycle consisting of a temperature rise from room temperature to 1,250° C of 5-½ hours and a 30 minute soak at 1,250° C. After the 6 hour pressing cycle, the heat input and pressure were stopped and the mold and contents allowed to cool for about 10 hours at which point the 10 tiles were removed from the mold setup. The density of these hot-pressed tiles was about 3.9 g/cc. The plates were tested ballistically against high quality, high cost boron carbide armor plate. The hot-pressed bauxite plates were equivalent to the boron carbide plates, both types of plates being of equal thickness, with respect to their ability to resist penetration of ballistic projectiles.

EXAMPLE IV

A 6 × 6 × ⅜ inch bauxite ceramic plate was made which contained a 6 × 6 inch No. 12 mesh 304 stainless steel screen located approximately midway of the thickness of the ⅜ inch plate. This wire screen reinforced plate was fabricated in the same manner as described in Example III with respect to preparation of the raw bauxite for the cold forming phase of the process and the hot-pressing conditions. The cold pressing phase of the process differed in this case as follows:

The cold pressing was done in two steps. First, 130 grams of the Methocel solution treated bauxite was placed in a 6 × 6 inch steel mold and pressed at 1,500 psi. The top plate of the mold was then removed and the No. 12 mesh 304 stainless steel screen measuring 6 × 6 was placed in the mold on top of the already cold formed material, the screen was then followed by 130 grams of Methocel treated bauxite, the top plate was replaced and the composite pressed at 1,500 psi. The cold pressed composite, which measured 6 × 6 × ¾ inches, was then stripped from the mold, dried and hot-pressed as described in Example III. This ceramic bauxite-wire mesh composite plate maintained its geometric configuration despite impact of sufficient energy to shatter the ceramic bauxite portion of the composite.

Figure 5:
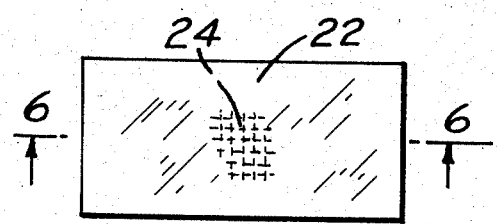
FIG. 5 is still another hot-pressed "bauxite" ceramic plate 22 containing no visible appurtenances.
Figure 6:
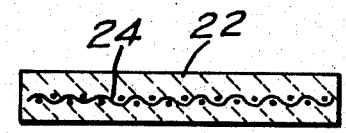
FIG. 6 is a sectional edge view of plate 22 taken along the line 6—6 in FIG. 5, showing the wire mesh 24 molded into the middle of the plate 22.
Figure 7:
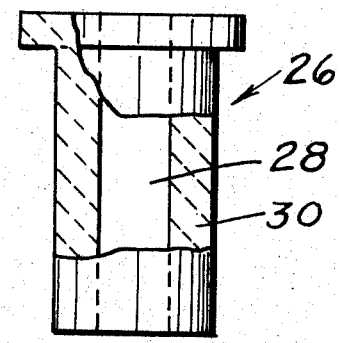
FIG. 7 is an elevated longitudinal view of a hot-pressed "bauxite" ceramic sandblasting nozzle 26, with a longitudinal partial section view of the sandblasting nozzle 26, showing the inner chamber 28 and the surrounding wall 30.

This "reinforced" ceramic armor plate is shown in FIGS. 5 and 6.

What is claimed is:

1. Hot-pressed ceramic articles of low cost, high strength, and persistent resistance to wear, made from bauxite compositions, said articles having a specific gravity of at least 3.62 grams per cubic centimeter and a numerical average crystal size of 1.8 microns or less, a wear factor of less than 0.31, a minimum transverse strength of 45,000 psi and a minimum compressive strength of 375,000 psi, said bauxite compositions being composed of 78–94 percent $Al_2O_3$, less than 9 percent $SiO_2$, 2–8 percent $Fe_2O_3$, 2–4 percent $TiO_2$, and a total of less than 3 percent total of CaO, MgO, and $Na_2O$.

* * * * *